United States Patent [19]

Ohmae et al.

[11] Patent Number: 4,980,238
[45] Date of Patent: Dec. 25, 1990

[54] AQUEOUS DISPERSION OF CATIONIC POLYMER

[75] Inventors: Tadayuki Ohmae; Kentaro Mashita; Noboru Yamaguchi; Kouichiro Asao, all of Chiba; Norio Kondo, Osaka; Tadashi Sakurai, Chiba, all of Japan

[73] Assignee: Sumitomo Chemical Company, Ltd., Osaka, Japan

[21] Appl. No.: 236,807

[22] Filed: Aug. 26, 1988

Related U.S. Application Data

[62] Division of Ser. No. 119,448, Nov. 12, 1987.

[30] Foreign Application Priority Data

Nov. 11, 1986 [JP] Japan .................. 61-268900

[51] Int. Cl.$^5$ .............................. B32B 23/08
[52] U.S. Cl. .................. 428/514; 428/411.1; 428/515; 428/520; 428/518
[58] Field of Search ............. 428/411.1, 514, 515, 428/518, 520

[56] References Cited

U.S. PATENT DOCUMENTS 4,318,956  3/1982  Stevens ........................ 524/555
4,379,869  4/1983  Siadat et al. ................. 524/555
4,546,140  10/1985 Shih ........................... 524/815
4,737,357  4/1988  Lehmann et al. ............... 524/555

FOREIGN PATENT DOCUMENTS

98403/83  6/1981  Japan .
0948701  2/1964  United Kingdom ............. 524/815

Primary Examiner—Joseph L. Schofer
Assistant Examiner—J. M. Reddick
Attorney, Agent, or Firm—Sughrue, Mion, Zinn, Macpeak & Seas

[57] ABSTRACT

An aqueous dispersion of a cationic polymer is disclosed, which is obtained by reacting an ethylene copolymer comprising from 40 to 80% by weight of ethylene and from 20 to 60% by weight of at least one aminoalkyl acrylamide comonomer represented by formula (I):

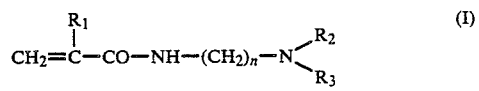

wherein $R_1$ represents a hydrogen atom or a methyl group; $R_2$ and $R_3$ each represents a hydrogen atom or an alkyl group having from 1 to 4 carbon atoms; and n represents an integer of from 2 to 4,
and having a melt index, as measured in accordance with JIS K-6760, of from 10 to 1,000 g/10 min with hydrochloric acid in water to form a quaternary salt and subsequently reacting the resulting quaternary salt with an epihalohydrin compound through addition reaction. The aqueous dispersion provides a coating film having an improved electrical conductivity or produces effects to simultaneously improve degree of sizing and wet strength of paper.

4 Claims, No Drawings

AQUEOUS DISPERSION OF CATIONIC POLYMER

This is a division of application Ser. No. 119,448 filed Nov. 17, 1987.

FIELD OF THE INVENTION

This invention relates to an aqueous dispersion of a cationic polymer prepared from a novel ethylene copolymer.

The cationic polymer aqueous dispersion of this invention is useful in the formation of a soft and water-resistant antistatic or semi-conductive coating film. Such a coating film can be formed by impregnating or coating a substrate, such as paper and a plastic film, with the aqueous dispersion and drying.

In an important application, the cationic polymer aqueous dispersion of this invention can be applied to an electrographic recording system, in which a latent pattern is formed by electrical signals on an electrographic recording material comprising an electrically insulating support having provided thereon a conductive layer and a recording layer in this order, and a charged toner powder is fixed thereon to obtain a visualized pattern. In this application, the polymer aqueous dispersion according to the present invention can be used in the conductive layer either alone or in combination with a metal oxide semiconductor to provide an electrographic recording material excellent in film properties and recording performance.

In another application, the cationic polymer aqueous dispersion of this invention is useful as an additive in paper manufacturing. In some detail, the aqueous dispersion of the present invention can be added in a process of sheet forming under a neutral or alkaline condition to increase both degree of sizing and wet strength and is, therefore, suitable for use in the production of paper containers, water-resistant reinforced corrugated boards, and the like. In addition, the cationic polymer aqueous dispersion of the present invention is promising for application to dust-proof paper, packaging paper for IC parts, etc. taking advantage of its effects in reducing surface resistivity or volume resistivity; heat-sealing paper, etc. taking advantage of its heat sealability; and colored substrates for laminated decorative plates and colored paper, etc. taking advantage of its properties to fix dyes or pigments.

BACKGROUND OF THE INVENTION

There have been proposed several polymer aqueous dispersion as conductivity-imparting agents or antistatics with which an electrically insulating substrate, such as paper and plastic films, is impregnated or coated, followed by drying. Among them, well known is an aqueous dispersion of a cationic styrene polymer obtained by reacting chloromethylated polystyrene with a tertiary amine to form a quaternary salt, as disclosed, e.g., in Japanese Patent Publication Nos. 7871/73 and 34150/74. However, since a coating film formed by coating the cationic styrene polymer on paper or a plastic film and drying lacks softness, the substrate tends to curl or the coating film tends to suffer cracking during preservation, causing adverse influences on surface conductivity.

In cases where a cationic polymer is used in a conductive layer of an electrographic recording material, it is generally mixed with a metal oxide semi-conductor, etc. for the purpose of improving conductivity and reducing humidity dependence of surface resistivity as taught, e.g., in Japanese Patent Application (OPI) Nos. 9524/80 and 33133/80 (the term "OPI" as used herein means "unexamined published Japanese patent application"). In this connection, the cationic styrene polymer, when used alone, is insufficient in terms of receptivity to inorganic fillers. The receptivity to the metal oxide semiconductor is of particular importance taking stability of a recorded image in a low humidity atmosphere into consideration.

On the other hand, well-known aqueous dispersions of a cationic polymer prepared from an ethylene copolymer include an aqueous dispersion obtained by reacting an ethylene/aminoalkyl acrylate compound copolymer with an acid in water as disclosed in Japanese Patent Application (OPI) No. 16542/72. This aqueous dispersion is excellent in receptivity to inorganic fillers, such as metal oxide semi-conductors (e.g., zinc oxide, tin oxide, titanium oxide, etc.) and, when coated on a substrate, e.g., paper and plastic films, and dried, provides a semi-conductive coating film having not only softness but resistance to water or solvents. In spite of these advantages, however, the coating film formed by the aqueous dispersion prepared from an ethylene/aminoalkyl acrylate compound copolymer has a relatively higher surface resistivity as compared with that of the cationic styrene polymer. Such an aqueous dispersion applied to a conductive layer of an electrographic recording material fails to attain sufficient recording performance and, therefore, has not yet been put in practical use.

In the field of sheet forming, the system disclosed in Japanese Patent Application (OPI) Nos. 98304/83 and 180697/83 is noteworthy. According to this system, sizing and wet strength enhancement can be achieved simultaneously by adding to an aqueous pulp slurry an aqueous dispersion obtained by reacting an ethylene/aminoalkyl acrylate compound copolymer with a variety of organic or inorganic acids in water to form a quaternary salt and then reacting it with an epihalohydrin through addition reaction.

The inventors have conducted studies toward practical application of the above-described technique. However, since the aqueous dispersion prepared from the ethylene/aminoalkyl acrylate compound copolymer should be added in a relatively large amount in order to produce effects as expected, the results obtained were unsatisfactory for practical use from the standpoint of economy as compared with the commonly employed system wherein a sizing agent and a wet strength agent are used in combination.

Hence, it has been demanded to solve various problems associated with the conventional aqueous dispersion prepared from an ethylene/aminoalkyl acrylate compound copolymer, i.e., insufficient conductivity of a coating film obtained therefrom, and insufficient performance to simultaneously impart sizing properties and wet strength in sheet forming.

SUMMARY OF THE INVENTION

Accordingly, one object of this invention is to provide an aqueous dispersion of a cationic polymer prepared from an ethylene copolymer which is practically useful in view of both performance and economy as a conductive layer of an electrographic recording material or an additive for paper manufacturing.

As a result of extensive investigations, it has now been found that an aqueous dispersion of a cationic polymer prepared from a novel copolymer of ethylene and an aminoalkyl acrylamide comonomer exhibits markedly improved conductive film-forming properties as well as markedly improved effects to simultaneously impart sizing properties and wet strength as compared with the conventional cationic polymer aqueous dispersion. The present invention has been completed based on this finding.

In a first embodiment of the present invention, there is provided an aqueous dispersion of a cationic polymer obtained by reacting an ethylene copolymer comprising from 40 to 80% by weight of ethylene and from 20 to 60% by weight of at least one aminoalkyl acrylamide comonomer represented by formula (I) shown below and having a melt index (measured in accordance with JIS K6760) of from 10 to 1,000 g/10 min with hydrochloric acid in water to form a quaternary salt and subsequently reacting the resulting quaternary salt with an epihalohydrin compound through addition reaction.

Formula (I) is represented by

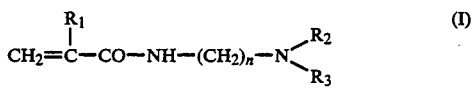

wherein $R_1$ represents a hydrogen atom or a methyl group; $R_2$ and $R_3$ each represents a hydrogen atom or an alkyl group having from 1 to 4 carbon atoms; and n represents an integer of from 2 to 4.

In a second embodiment of the present invention, there is provided an aqueous dispersion of a cationic polymer obtained by adding an alkylolamine compound to the above-described cationic polymer aqueous dispersion, followed by heat treatment.

Firstly, the aqueous dispersion according to the present invention is characterized not only by excellent receptivity to inorganic fillers, such as metal oxide semiconductors, but by softness of a coating film formed therefrom which eliminates causes of troubles, such as cracking of a coating film or curling of a substrate, and by satisfactory water resistance and solvent resistance of a coating film formed therefrom which leads to higher reliability on practical use as compared with commercially available aqueous dispersions of cationic styrene polymers. Moreover, the aqueous dispersion of the first embodiment provides a superior coating film whose surface resistivity is far lower than that of the coating film obtained by the conventional cationic polymer aqueous dispersion prepared from an ethylene/aminoalkyl acrylate compound copolymer.

Secondly, the aqueous dispersion according to this invention is characterized by markedly improved effects to simultaneously impart sizing properties and wet strength over the aforesaid conventional aqueous dispersions, so that a desired level of performance on practical use can be achieved with a reduced amount of the additive.

DETAILED DESCRIPTION OF THE INVENTION

The ethylene copolymer which can be used as a starting material can be prepared by radical polymerization of from 40 to 80% by weight, preferably from 50 to 75% by weight, of ethylene and from 20 to 60% by weight, preferably from 25 to 50% by weight, of at least one aminoalkyl acrylamide comonomer represented by formula (I) under high temperature and high pressure conditions.

If the content of the aminoalkyl acrylamide comonomer unit in the ethylene copolymer is less than 20% by weight, i.e., if the ethylene unit content is more than 80% by weight, the product resulting from the addition reaction between the quaternary salt and an epihalohydrin compound would have poor hydrophilicity, failing to provide a stable aqueous dispersion comprising uniform fine particles. On the other hand, if the ethylene unit content is less than 40% by weight, i.e., the aminoalkyl acrylamide comonomer unit content exceeds 60% by weight, the resulting aqueous dispersion only forms a coating film having insufficient water resistance and too low film strength. When such a film is used as a conductive layer of an electrographic recording material, writing with a pencil or a ball-point pen would be impossible, or when such an aqueous dispersion is used as an additive for paper, the improving effects on sizing properties would be insufficient.

From the standpoint of viscosity of the aqueous dispersion and physical properties of a coating film formed by the aqueous dispersion, and particularly film strength, the ethylene copolymer to be used in the present invention should have a melt index of from 10 to 1,000 g/10 min, preferably from 30 to 500 g/10 min, as measured according to JIS K-6760.

The above-described ethylene copolymer can be prepared by high-pressure radical polymerization in accordance with the process described, e.g., Japanese Patent Publication Nos. 22523/67 and 5194/78. More specifically, ethylene and the aminoalkyl acrylamide compound of formula (I) are continuously fed to a vessel-type reactor with a stirrer or a tubular-type reactor together with a free-radical catalyst, such as oxygen, organic peroxides, diazo compounds, etc., to effect polymerization at a pressure of from 500 to 3,000 kg/cm$^2$ and at a temperature of from 100 to 300° C. Various chain transfer agents, such as ethane, propane, propylene, etc., may be used to regulate the molecular weight of the polymer.

Specific examples of the aminoalkyl acrylamide comonomers which can be used preferably in the present invention are dimethylaminoethyl acrylamide, dimethylaminopropyl acrylamide, dimethylaminobutyl acrylamide, diethylaminoethyl acrylamide, diethylaminopropyl acrylamide, diethylaminobutyl acrylamide, di-n-propylaminoethyl acrylamide, di-n-propylaminopropyl acrylamide, N-(1,1-dimethyl-3-dimethylaminopropyl) acrylamide, etc., and methacrylamide derivatives corresponding to these acrylamide derivatives. These aminoalkyl acrylamide comonomers may be used either individually or in combinations of two or more thereof.

Among the above-enumerated comonomers, more preferred are dimethylaminopropyl acrylamide, dimethylaminopropyl methacrylamide, dimethylaminoethyl acrylamide, and dimethylaminoethyl methacrylamide.

For the purpose of enhancing softness of a coating film formed by the aqueous dispersion or lowering a heatsealing temperature, the ethylene copolymer may further comprise one or more comonomers other than ethylene and the aminoalkyl acrylamide compound, such as methyl acrylate, methyl methacrylate, ethyl acrylate, n-butyl acrylate, vinyl acetate, vinyl propionate, dimethylaminoethyl methacrylate, dimethylaminoethyl acrylate, and the like, at a ratio up to 20% by weight.

The amount of hydrochloric acid to be used in quaternarization of the ethylene copolymer ranges from 50 to 200 parts, preferably from 80 to 150 parts, by mole per 100 parts by mole of the amino group in the ethylene copolymer. If the amount of hydrochloric acid is less than 50 parts, the resulting quaternary salt would have poor hydrophilicity, and the addition product obtained by the subsequent reaction with an epihalohydrin compound cannot provide a stable and low-viscosity aqueous dispersion comprising uniform fine particles. On the other hand, if the amount of hydrochloric acid exceeds 200 parts, a coating film formed by the resulting aqueous dispersion would have insufficient water resistance and film strength.

The quaternarization of the ethylene copolymer with hydrochloric acid can sufficiently be achieved by adding usually from 5 to 35 parts by weight of the ethylene copolymer in the form of pellets or powders and hydrochloric acid to 100 parts by weight of water and stirring the mixture at a temperature of from 60 to 100° C. for a period of from 30 to 120 minutes under atmospheric pressure. In some cases, the ethylene copolymer retains its shape during the quaternarization reaction while merely being swollen with a hydrochloric acid aqueous solution. Such a state gives rise to no problem since the reaction system turns to be an aqueous dispersion comprising fine particles through the subsequent addition reaction with an epihalohydrin compound.

The thus prepared quaternary hydrochloride of the ethylene copolymer is then addition reacted with an epihalohydrin compound to thereby form a uniform and stable aqueous dispersion.

The epihalohydrin compound to be reacted includes epichlorohydrin, epibromohydrin, etc., with epichlorohydrin being particularly preferred. The epihalohydrin-compound is used in an amount of from 50 to 200 parts by mole, preferably from 80 to 150 parts by mole, per 100 parts by mole of the amino group contained in the ethylene copolymer. When the amount of the epihalohydrin compound is less than 50 parts, a stable and low-viscosity aqueous dispersion comprising uniform fine particles cannot be obtained. If it exceeds 200 parts, the resulting aqueous dispersion only forms a coating film having insufficient water resistance and small film strength, causing problems on practical use.

The addition reaction with the epihalohydrin compound can be usually carried out under stirring at a temperature ranging from 20 to 100° C., preferably from 40 to 90° C., for 30 to 300 minutes. The mode of feeding the epihalohydrin compound is not particularly limited, and it can be fed all at once, continuously, or intermittently.

If desired, the thus prepared cationic polymer aqueous dispersion according to the present invention may be subjected to heat treatment in the presence of an alkylolamine compound. The aqueous dispersion obtained by this heat treatment provides a coating film having a further reduced surface resistivity.

The alkylolamine compound to be used includes ethanolamine, diethanolamine, triethanolamine, isopropanolamine, diisopropanolamine, triisopropanolamine, dihydroxypropylamine, bis(dihydroxypropyl)amine, tris(dihydroxypropyl)amine, and the like. In addition, polyamine-polyhydric alcohol compounds obtained by reacting a polyamine and an alkylene oxide, such as an ethylene oxide (4 mols) adduct of ethylenediamine, an ethylene oxide (4 mols) adduct of propylenediamine, etc., may also be employed Of these alkylolamine compounds preferred is diethanolamine.

The alkylolamine compound is added in an amount of from 20 to 200 parts by mole, preferably from 50 to 150 parts by mole, per 100 parts by mole of the amino group present in the ethylene copolymer. Amounts less than 20 parts are not enough to produce desired effects to reduce a surface resistivity of a coating film formed by the resulting aqueous dispersion. On the other hand, if the amount of the alkylolamine compound exceeds 200 parts, since the excess remains unreacted in the resulting aqueous dispersion, a coating film obtained therefrom becomes not only non-uniform but hygroscopic, resulting in increased humidity dependence of surface resistivity.

The reaction with the alkylolamine compound is usually carried out at a temperature of from 20 to 100° C., preferably from 40 to 100° C., for a period of from 1 to 10 hours.

The cationic polymer aqueous dispersion according to the present invention preferably has a solids content ranging from 5 to 50 parts, more preferably from 10 to 40 parts, by weight per 100 parts by weight of water content. The term "solids content" as used herein means a nonvolatile content which is left after removing water from the aqueous dispersion by drying in hot air at about 100° C. An aqueous dispersion having a solids content exceeding 50 parts has no fluidity due to too a high viscosity and is inferior in processability, such as coating properties on a substrate. An aqueous dispersion having a solids content less than 5 parts is unfavorable for production efficiency and also from the standpoint of distribution cost and drying load after coating.

In the film formation, the aqueous dispersion is coated on a substrate, e.g., paper and a plastic film, and dried by heating at about 50° C. to 150° C.

In the cases where the aqueous dispersion of the invention is used as a conductive layer of an electrographic recording material, it may be mixed with a metal oxide semi-conductor, e.g., zinc oxide, cuprous oxide, indium oxide, tin oxide, titanium oxide, cobalt oxide, nickel oxide, tantalum pentoxide, vanadium pentoxide, tungsten trioxide, molybdenum trioxide, etc., or these metal oxides doped with a dopant. The combined use of these metal oxide semi-conductors is effective to further decrease a surface resistivity of the resulting conductive layer and also to reduce humidity dependence of recording density.

As a resin solution for a dielectric layer which is to be applied onto the semi-conductive laminate prepared by coating the aqueous dispersion of the invention on a paper or plastic film and then drying, in order to imparting writing properties, marking properties, or natural feeling to acrylic resins, vinyl chloride resins, butyral resins, etc., paints having dispersed therein pigments (e.g., titanium oxide, calcium carbonate, starch, clay, etc.) in the finely granular state are generally used. These paints are applied in a thickness of from bout 5 to 10 $\mu$m on a dry basis. The surface resistivity thereof is preferably from about $10^{12}$ to $10 \cdot \Omega$ at ordinary temperature and at atmospheric pressure.

If desired, it is also possible to incorporate into the aqueous dispersion of the invention additives, such as dyes, pigments, fillers, surface active agents, antistatics, plasticizers, lubricants, dispersing agents, defoaming agent, etc., and water-soluble resins, e.g., polyvinyl alcohol.

According to the present invention, a thin, transparent, soft, and tough coating film can be obtained by coating the aqueous dispersion on a paper or plastic film substrate, followed by drying The coating film after drying becomes water-insoluble to exhibit excellent stability against humidity or water Therefore, an electrographic recording material in which the conductive layer comprises the aqueous dispersion of the present invention has small dependence of recording density on humidity and is free from changes in recording performance with a lapse of time. When the aqueous dispersion is used as an antistatic, the resulting film exhibits long-lasting antistatic properties.

Further, use of the aqueous dispersion of the present invention as an additive in the sheet forming process results in marked improvements on both sizing properties and wet strength of paper. In this application, the aqueous dispersion may be either added to a pulp slurry as a wet end additive or impregnated into paper. In the former case, the cationic polymer as dispersed in water is usually added to a pulp slurry in an amount of from 0.1 to 5 parts by weight per 100 parts by weight of pulp on dry basis, and the formed sheet is then dried by heating at a temperature of from 70 to 150° C. for a period of from several seconds to several minutes. In this case, a water repellent, such as waxes, silicones, and fluorohydrocarbon resins, and the like, may be used in combination.

The present invention will now be illustrated in greater detail with reference to the following examples, but it should be understood that the present invention is not deemed to be limited thereto In these examples, all the percents and ratios are given by weight unless otherwise indicated.

EXAMPLE 1

In a 1,000 ml-volume glass-made flask were charged 360 g of water, 100 g of pellets of an ethylene/dimethylaminopropyl acrylamide copolymer having an ethylene/dimethylaminopropyl acrylamide ratio of 59:41 and a melt index of 300 g/10 min as measured according to JIS KIS-6760, hereinafter the same), and 27 g of a 36% hydrochloric acid aqueous solution The amount of the hydrochloric acid charged corresponded to 100 parts by mole per 100 parts by mole of the amino group in the copolymer. The temperature of the mixture was elevated from room temperature to 100° C. over a period of 30 minutes while stirring, at which the stirring was continued for an additional 60 minutes under refluxing whereby the pellets were destroyed to obtain a viscous aqueous slurry.

After cooling to 80° C. while stirring, 24 g (corresponding to 100 parts by mole per 100 parts by mole of the amino group in the copolymer) of epichlorohydrin was added dropwise to the slurry over a period of 30 minutes. The stirring was further continued for 270 minutes at 80° C. to prepare a pale brown uniform aqueous dispersion. The resulting aqueous dispersion was designated as Dispersion A-1. Dispersion A-1 had a pH of 5.6 at 25° C. and a viscosity of 49 cps at 25° C. The dispersed polymer particles had a particle size of 0.1 $\mu$m or less. Dispersion A-1 had a solids content (hereinabove defined) of 26%.

EXAMPLE 2

In a 1,000 ml-volume glass-made flask was put 490 g of Dispersion A-1 prepared in Example 1, and 28 g (corresponding to 100 parts by mole per 100 parts by mole of the amino group in the copolymer) of diethanolamine was added thereto while stirring at 80° C. The stirring was continued at that temperature for an additional 300 minutes, followed by cooling to obtain a pale brown uniform aqueous dispersion. The resulting dispersion was designated as Dispersion A-2. Dispersion A-2 had a pH of 6.9 at 25° C., a viscosity of 17 cps at 25° C., and a solids content of 30%. The dispersed polymer particles had a particle size of 0.1 $\mu$m or less.

EXAMPLES 3 TO 8

Dispersions A-3 to A-8 were prepared in the same manner as in Example 1 or 2, except for replacing the ethylene/dimethylaminopropyl acrylamide copolymer as used in Example 1 or 2 with pellets of various ethylene copolymers whose compositions and melt indices are shown in Table 1. Each of Dispersions A-3 to A-8 was a stable and low-viscosity aqueous dispersion comprising polymer particles having a particle size of 1 $\mu$m or less.

REFERENCE EXAMPLES 1 TO 3

In order to evaluate performance of the aqueous dispersions according to the present invention as a conductive coating or an additive in paper manufacturing, comparative aqueous Dispersions R-1 to R-3 were prepared in the same manner as in Example 1 or 2, except for replacing the ethylene/dimethylaminopropyl acrylamide copolymer with copolymers comprising ethylene and an aminoalkyl acrylate comonomer as shown in Table 1. Any of Dispersions R-1 to R-3 had dispersion properties similar to the aqueous dispersions obtained in Examples 1 and 2, i.e., low viscosity and a particle size of 1 $\mu$m or less.

REFERENCE EXAMPLES 4

The same ethylene copolymer as used in Example 5 (dimethylaminopropyl acrylamide content: 50%) was quaternarized using 1.3 molar times of hydrochloric acid in the same manner as in Example 1 to prepare a quaternary salt having a solids content of 24%. The product was a viscous solid-liquid mixture in the form of a slurry. Making a comparison with Example 5, it is apparent that subsequent addition of epichlorohydrin is essential for obtaining a stable aqueous dispersion comprising fine particles.

REFERENCE EXAMPLES 5 AND 6

The procedure of Example 1 or 2 was followed, except for starting with an ethylene copolymer having a dimethylaminopropyl acrylamide content of 15% and a melt index of 100 g/10 min, but the attempt to form a uniform aqueous dispersion failed because the pellets of the copolymer were not completely destroyed.

TABLE 1

| Example No. | Ethylene Copolymer Comonomer (Content: wt %) | Ethylene Copolymer Melt Index (g/10 min) | Amount of Hydrochloric Acid (molar ratio to amino group) | Amount of Epichloro-hydrin (molar ratio to amino group) | Alkylolamine Kind | Alkylolamine Amount (molar ratio to amino group) | Aqueous Dispersion Solids Content (wt %) | Aqueous Dispersion pH | Aqueous Dispersion Viscosity (25° C.) (cps) | Uniformity | Sample No. |
|---|---|---|---|---|---|---|---|---|---|---|---|
| 1 | PAA[1] (41) | 300 | 1.0 | 1.0 | — | — | 26 | 5.6 | 49 | good | A- |
| 2 | " " | " | " | " | DEA[5] | 1.0 | 30 | 6.9 | 17 | good | A- |
| 3 | " " | " | " | " | MEA[6] | " | 25 | 7.1 | 32 | good | A- |
| 4 | " (35) | 280 | " | " | DEA | 2.0 | 25 | 7.3 | 20 | good | A- |
| 5 | " (50) | 55 | 1.3 | 1.5 | — | — | 27 | 6.7 | 35 | good | A- |
| 6 | PMA[2] (39) | 270 | 1.0 | 1.0 | — | — | 22 | 6.5 | 31 | good | A- |
| 7 | " " | " | " | " | DEA | 2.0 | 25 | 6.8 | 20 | good | A- |
| 8 | " (28) | 96 | 1.2 | 1.2 | — | — | 17 | 6.7 | 84 | good | A- |
| Reference Example 1 | EM[3] (39) | 300 | 1.0 | 1.0 | — | — | 25 | 5.5 | 42 | good | R- |
| 2 | " " | " | " | " | DEA | 1.0 | 30 | 7.1 | 9 | good | R- |
| 3 | EA[4] (35) | 250 | " | " | " | 2.0 | 25 | 7.3 | 52 | good | R- |
| 4 | AA (50) | 55 | 1.3 | 0 | — | — | 24 | 4.4 | 870 | poor | — |
| 5 | " (15) | 100 | 1.0 | 1.0 | — | — | 20 | 6.6 | — | poor | — |
| 6 | " " | " | " | " | DEA | 1.0 | 22 | 7.0 | — | poor | — |

Note:
1) Dimethylaminopropyl acrylamide
2) Dimethylaminopropyl methacrylamide
3) Dimethylaminoethyl methacrylate
4) Dimethylaminoethyl acrylate
5) Diethanolamine
6) Monoethanolamine

EXAMPLE 9

Dispersion A-2 prepared in Example 2 was coated on wood free paper having a basis weight of 84 g/m² by means of a bar coater #10 and dried at 100° C. for 5 minutes in a hot air-circulating drier to obtain curling-free coated paper having formed thereon a uniform semi-conductive film having a dry weight of 1.2 g/m².

Surface resistivity of the coated surface of the paper was determined by the use of a resistance meter (Super-insulation meter SM-l0E model, manufactured by Toa Denpa Kogyo K.K.) under conditions of 23° C. in temperature, 30%, 50%, or 70% in relative humidity (RH), and 100 V in applied voltage and was found to be $5 \times 10^7$, $8 \times 10^6 \Omega$, $9 \times 10^5 \Omega$, respectively, as shown in Table 2. The surface resistivity of paper before coating was $4 \times 10^{13}$ at 50% RH.

A coating agent for a dielectric layer "C" (methyl ethyl ketone solution of a vinyl acetate/vinyl chloride/-vinyl alcohol terpolymer resin produced by Sakata Shokai K.K.; solids content: 28%) and "Softon®1800" (a registered trade name of calcium carbonate fine powders produced by Bihoku Funka Kogyo K.K.; mean particle size: 1.25 μm) were mixed at a weight ratio of 70:30 to prepare a dispersion. The resulting dispersion was coated on the semi-conductive film of the above-obtained coated paper by the use of a bar coater #10, air-dried in a draft, and dried in a circulating hot-air drier at 100° C. for 5 minutes to obtain electrographic recording paper having a coating layer of 6.0 g/m² in total dry weight.

When an electrographic recording test was carried on the resulting electrographic recording paper at 30% RH by the use of an electrographic recording testing machine (Electrographic Plotter EP101, AO type; manufactured by Matsushita Denso K.K.), a very sharp recorded pattern could be obtained.

EXAMPLES 10 TO 13

Curling-free coated paper having a uniform and glossy coating film was prepared in the same manner as in Example 9, except for replacing Dispersion A-2 with Dispersions A-3, A-4, A-5, or A-7 obtained in Examples 3, 4, 5, or 7, respectively. Each of the resulting coated papers had a satisfactory level of surface resistivity as indicated in Table 2.

The coated paper was further coated with a dielectric layer in the same manner as in Example 9 to obtain electrographic recording paper. The resulting recording paper exhibited excellent recording performance in each case.

COMPARATIVE EXAMPLES 1 AND 2

Coated paper was prepared in the same manner as in Example 9, except for replacing Dispersion A-2 with Dispersion R-2 or R-3 prepared in Reference Example 2 or 3, respectively. Surface resistivities of the resulting coated papers were relatively high as shown in Table 2. Therefore, electrographic recording paper produced from each of these coated papers in the same manner as in Example 9 showed poor recording performance only providing totally unclear patterns from which many dots vanished From the foregoing, it can be seen that the aqueous dispersions prepared from the ethylene/aminoalkyl acrylamide compound copolymer according to the present invention forms a coating film having higher electrical conductivity, which leads to production of electrographic recording paper exhibiting higher performance, than the aqueous dispersions prepared from the ethylene/aminoalkyl acrylate copolymer

TABLE 2

| Example No. | Aqueous Dispersion Sample No. | Coating Weight (on dry basis) (g/m²) | Coated Paper Surface Resistivity (Ω) 30% RH | Coated Paper Surface Resistivity (Ω) 50% RH | Coated Paper Surface Resistivity (Ω) 70% RH | Electrographic Recording Performance (30% RH, 23° C.) |
|---|---|---|---|---|---|---|
| Example 9 | A-2 | 1.2 | $5 \times 10^7$ | $8 \times 10^6$ | $9 \times 10^5$ | good |

TABLE 2-continued

| Example No. | Aqueous Dispersion | | Coated Paper Surface Resistivity ($\Omega$) | | | Electrographic Recording Performance (30% RH, 23° C.) |
|---|---|---|---|---|---|---|
| | Sample No. | Coating Weight (on dry basis) (g/m²) | 30% RH | 50% RH | 70% RH | |
| Example 10 | A-3 | 1.0 | $7 \times 10^7$ | $1 \times 10^7$ | $2 \times 10^6$ | good |
| Example 11 | A-4 | 1.2 | $7 \times 10^7$ | $9 \times 10^6$ | $9 \times 10^5$ | good |
| Example 12 | A-5 | 1.7 | $8 \times 10^7$ | $7 \times 10^6$ | $8 \times 10^5$ | good |
| Example 13 | A-7 | 1.3 | $6 \times 10^7$ | $9 \times 10^6$ | $1 \times 10^6$ | good |
| Comparative Example 1 | R-2 | 1.2 | $4 \times 10^8$ | $5 \times 10^7$ | $6 \times 10^6$ | poor |
| Comparative Example 2 | R-3 | 1.0 | $5 \times 10^8$ | $6 \times 10^7$ | $7 \times 10^6$ | poor |

EXAMPLE 14

To 100 g of Dispersion A-1 prepared in Example 1 was added 25 g of powderous conductive zinc oxide (produced by Honjo Chemical K.K.; mean particle size 1.5 μm; disclosed in Japanese Patents 1,029,615 and 1,029,616), and the mixture was stirred at room temperature for 30 minutes to prepare a gray mixture having uniformly dispersed therein zinc oxide particles. The resulting mixture was coated on wood free paper having a basis weight of 84 g/m² with a bar coater #10 and dried in hot air of 110° C. for 3 minutes to obtain coated paper having provided thereon a uniform white coating film having a dry weight of 7.6 g/m². The surface resistivities of the coated paper were measured under the same conditions as in Example 9 and found to be $2 \times 10^6$, $7 \times 10^5$, and $5 \times 10^5 \Omega$ at 30, 50, and 70% RH, respectively, indicating that the coated paper had low resistivity with small dependence on humidity.

Separately, a uniform dispersion was prepared by mixing 100 g of a coating agent for a dielectric layer "50C" (a toluene solution of an acrylic resin produced by Nagase Kasei Kogyo K.K.; solids content 50%), 50 g of the same calcium carbonate as used in Example 9, and 180 g of toluene with stirring. The dispersion was coated on the above prepared coated paper with a bar coater #10 and dried in hot air at 110° C. for 5 minute to obtain electrographic recording paper having a total coating dry weight of 13.1 g/m².

When an electrographic recording test was carried out under the same conditions as in Example 9, a very clear recorded pattern free from disappearance of dots was obtained.

EXAMPLE 15

To 100 g of Dispersion A-5 prepared in Example 5 was added 18 g of flaky, transparent, and conductive mica "MEC-500" (mica particles having a mean particle size of 10 μm and a specific surface area of 19 m²/g coated with tin oxide and antimony oxide; produced by Teikoku Kako K.K ), followed by stirring at room temperature for 30 minutes to prepare a gray mixture having uniformly dispersed therein the mica particles The mixture was coated on a corona-treated surface of a 75 μm thick polyethylene terephthalate film "E-5101" (produced by Toyobo Co., Ltd ) by the use of a bar coater #10 and dried in hot air at 120° C. for 2 minutes to obtain a laminated film having a glossy, transparent, and highly adhesive coating film having a dry weight of 8.5 g/m². The surface resistivities of the coating film were found to be $9 \times 10^5$, $5 \times 10^5$, and $3 \times 10^5 \Omega$ at 30, 50, and 70% RH, respectively, as measured under the same conditions as in Example 9, indicating that the laminated film had low resistivity with small dependence on humidity.

A dielectric layer was formed on the laminated film same manner as in Example 14 to obtain semitransparent laminated film for electrographic recording having provided thereon coating layers having a total dry weight of 14.7 g/m² and a haze of 76%. As a result of an electrographic recording test under the same conditions as in Example 9, a very clear pattern free from dot disappearance was obtained.

EXAMPLES 16 TO 18

To a 1.0% pulp slurry having a Canadian Standard drainage rate of 410 cc and an N-BKP/L-BKP ratio of 1/1 was added Dispersions A-1, A-5 or A-7 in an amount indicated in Table 3, and the mixture was stirred at 200 rpm for 2 minutes. The slurry was formed into sheet by means of a TAPPI standard sheet machine and dried at 110° C. for a prescribed period (1 minute or 10 minutes) to obtain paper having a basis weight of 80 g/m². The degree of sizing and wet breaking length as a measure of wet strength of the resulting paper were determined as follows, and the results obtained are shown in Table 3.

1) Degree of Sizing:
   Determined in according to a Stöckigt method at 25° C. and 65% RH.
2) Wet Breaking Length (measured according to JIS P8113):
   Wet tensile strength after immersion in water at 20° C. for 60 minutes was measured, and a wet breaking length was calculated therefrom according to equation:

$$\text{Wet Breaking Length (km)} = \frac{\text{Measured Tensile Strength (kg)} \times 1000}{\text{Sample Width (mm)} \times \text{Basis Weight (g/m}^2\text{)}}$$

COMPARATIVE EXAMPLES 3 AND 4

Paper samples were prepared in the same manner as in Examples 16 to 18, except for replacing the aqueous dispersion of the invention with Dispersion R-1 or R-2 prepared in Reference Example 1 or 2. The degree of sizing and wet breaking length of the resulting paper were determined in the same manner as in Examples 16 to 18, and the results obtained are shown in Table 3.

Making comparisons with the results of Examples 16 to 18, it is apparent that the aqueous dispersions according to the present invention produce greater effects to improve both degree of sizing and wet strength than those obtained by the aqueous dispersions prepared from an ethylene/aminoalkyl acrylate compound copolymer.

COMPARATIVE EXAMPLE 5

Paper samples were prepared in the same manner as in Examples 16 to 18, except for replacing the aqueous dispersion of the present invention with "Sumirez Resin ® #675" (polyamide-epichlorohydrin type wet strength resin produced by Sumitomo Chemical Co., Ltd.; 25% aqueous solution). The degree of sizing and wet breaking length were determined in the same manner as in Examples 16 to 18, and the results obtained are shown in Table 3. It is revealed from Table 3 that the addition of the wet strength resin produces no sizing effect at all.

amide comonomer according to the present invention, when coated and dried on a substrate, provides a coating film having a significantly improved level of electrical conductivity and is, therefore, sufficiently applicable, for instance, as a polymer for a conductive layer of electrographic recording material.

Further, the aqueous dispersion of the present invention also serves as a wet end additive or an impregnant for paper to simultaneously improve degree of sizing and wet strength.

While the invention has been described in detail and with reference to specific embodiments thereof, it will be apparent to one skilled in the art that various changes and modifications can be made therein without departing from the spirit and scope thereof.

TABLE 3

| | Aqueous Dispersion | | Drying Time: 1 min | | Drying time: 10 min | |
|---|---|---|---|---|---|---|
| Example No. | Sample No. | Amount added (wt %) | Degree of Sizing (sec) | Wet Breaking Length (km) | Degree of Sizing (sec) | Wet Breaking Length (km) |
| Example 16 | A-1 | 0.4 | 59 | 1.80 | 65 | 1.86 |
| | | 0.8 | 88 | 2.57 | 90 | 2.62 |
| | | 2.0 | 97 | 3.82 | 99 | 3.86 |
| Example 17 | A-5 | 0.4 | 54 | 1.74 | 56 | 1.82 |
| | | 0.8 | 86 | 2.64 | 97 | 2.65 |
| | | 2.0 | 100 | 3.91 | 104 | 3.97 |
| Example 18 | A-7 | 0.4 | 51 | 1.76 | 53 | 1.79 |
| | | 0.8 | 82 | 2.46 | 89 | 2.51 |
| | | 2.0 | 101 | 3.72 | 104 | 3.94 |
| Comparative Example 3 | R-1 | 0.4 | 43 | 1.45 | 49 | 1.51 |
| | | 0.8 | 72 | 2.20 | 81 | 2.23 |
| | | 2.0 | 90 | 3.26 | 92 | 3.39 |
| Comparative Example 4 | R-2 | 0.4 | 40 | 1.52 | 43 | 1.55 |
| | | 0.8 | 69 | 2.33 | 75 | 2.37 |
| | | 2.0 | 88 | 3.48 | 90 | 3.51 |
| Comparative Example 5 | Sumirez Resin ® #675 | 0.4 | 0 | 0.78 | 0 | 1.32 |
| | | 0.8 | 0 | 1.08 | 0 | 1.92 |
| | | 2.0 | 0 | 0.24 | 0 | 2.70 |
| Control Example | none | — | 0 | 0.24 | 0 | 0.25 |

Note: *Based on the weight of the pulp.

EXAMPLES 19 AND 20

Hand-made unsized paper (10 cm ×30 cm) having a basis weight of 80 g/m² was dipped in 500 ml of Dispersion A-5 or A-8 diluted so as to have a polymer concentration as shown in Table 4 below and then dried in hot air of 110° C. for 5 minutes. The pickup of the polymer based on the weight of the unsized paper is shown in Table 4. The degree of sizing and wet breaking length of the resulting impregnated paper were determined in the same manner as in Examples 16 to 18, and the results obtained are shown in Table 4. Table 4 demonstrates the effects exerted on both degree of sizing and wet strength.

TABLE 4

| Example No. | Sample No. | Polymer Concentration (wt %) | Polymer Pickup (wt %) | Degree of Sizing (sec) | Wet Braking Length (km) |
|---|---|---|---|---|---|
| 19 | A-5 | 0.1 | 0.1 | 41 | 0.79 |
| | | 1.0 | 1.1 | 92 | 2.58 |
| | | 2.0 | 2.4 | 102 | 3.73 |
| 20 | A-8 | 0.1 | 0.1 | 45 | 0.71 |
| | | 1.0 | 1.2 | 97 | 2.42 |
| | | 2.0 | 2.7 | 105 | 3.57 |
| Control Example | none | — | — | 0 | 0.24 |

As described above, the aqueous dispersion prepared from a copolymer of ethylene and an aminoalkyl acryl-

What is claimed is:

1. A semi-conductor laminate comprising:
   a paper or plastic film,
   a semi-conductive film formed on said paper or plastic film by
   (a) coating said paper or plastic film with an aqueous dispersion of a cationic polymer obtained by
      (i) reacting an ethylene copolymer, comprising from 40 to 80% by weight of ethylene and from 20 to 60% by weight of at least one aminoalkyl acrylamide comonomer represented by formula (i) with hydrochloric acid in water to form a quaternary salt, and
      (ii) reacting said quaternary salt with an epihalohydrin compound through an addition reaction; and
   (b) drying said coated paper or plastic film at a temperature of from 50 to 150° C.;
   wherein formula (I) is

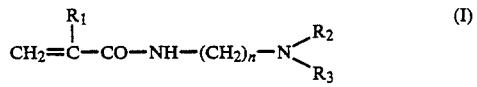

where
   $R_1$ represents a hydrogen atom or a methyl,
   $R_2$ and $R_3$ each represent a hydrogen atom or an alkyl group having from 1-4 carbon atoms, and n represents an integer from 2 to 4, and said ethylene copolymer has a melt index, as measured in accordance with JIS K6760, of from 10 to 1,000 g/10 min.

2. A semi-conductive laminate comprising:
a substrate and
a semi-conductive film formed on said substrate by
(a) coating said substrate with an aqueous dispersion of a cationic polymer obtained by
  (i) reacting an ethylene copolymer, comprising from 40 to 80% by weight of ethylene and from 20 to 60% by weight of at least one aminoalkyl acrylamide comonomer represented by formula (I), with hydrochloric acid in water to form a quaternary salt,
  (ii) reacting said quaternary salt with an epihalohydrin compound through an addition reaction, and
  (iii) reacting the product of said reaction (ii) with an alkylolamine compound; and
(b) drying said coated substrate at a temperature of from 50 to 150° C.;
wherein formula (I) is

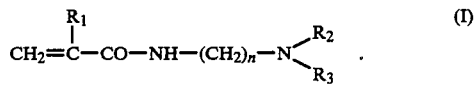

where
R$_1$ represents a hydrogen atom or a methyl,
R$_2$ and R$_3$ each represent a hydrogen atom or an alkyl group having from 1 to 4 carbon atoms, and
n represents an integer from 2 to 4; and said ethylene copolymer has a melt index, as measured in accordance with JIS K-6760, of from 10 to 1,000 g/10 min.

3. A laminate for electrographic recording comprising:
a substrate,
a semi-conductive layer on said substrate, and
a dielectric layer on said semi-conductive layer;
wherein said semi-conductive layer is formed by
(a) coating said substrate with an aqueous dispersion of a cationic polymer obtained by
  (i) reacting an ethylene copolymer, comprising from 40 to 80% by weight of ethylene and from 20 to 60% by weight of at least one aminoalkyl acrylamide comonomer represented by formula (I), with hydrochloric acid in water to form a quaternary salt, and
  (ii) reacting said quaternary salt with an epihalohydrin compound through an addition reaction; and
(b) drying said coated substrate at a temperature of from 50 to 150° C.; and
said dielectric layer is formed by
(a) coating said semi-conductive layer with a dielectric resin and
(b) drying said dielectric resin at a temperature of from 50 to 150° C.;
wherein formula (I) is

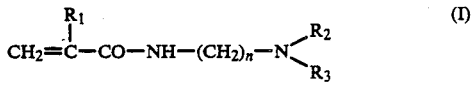

where
R$_1$ represents a hydrogen atom or a methyl,
R$_2$ and R$_3$ each represent a hydrogen atom or an alkyl group having from 1-4 carbon atoms, and
n represents an integer from 2 to 4; and said ethylene copolymer has a melt index, as measured in accordance with JIS K-6760, of from 10 to 1,000 g/10 min.

4. A laminate for electrographic recording comprising:
a substrate,
a semi-conductive layer on said substrate, and
a dielectric layer on said semi-conductive layer;
wherein said semi-conductive layer is formed by
(a) coating said substrate with an aqueous dispersion of a cationic polymer obtained by
  (i) reacting an ethylene copolymer, comprising from 40 to 80% by weight of ethylene and from 20 to 60% by weight of at least one aminoalkyl acrylamide comonomer represented by formula (I), with hydrochloric acid in water to form a quaternary salt, and
  (ii) reacting said quaternary salt with an epihalohydrin compound through an addition reaction, and
  (iii) reacting the product of said reaction (ii) with an alkylolamine compound; and
(b) drying-said coated substrate at a temperature of from 50 to 150° C.; and
said dielectric layer is formed by
(a) coating said semi-conductive layer with a dielectric resin and
(b) drying said dielectric resin at a temperature of from 50 to 150° C.;
wherein formula (I) is

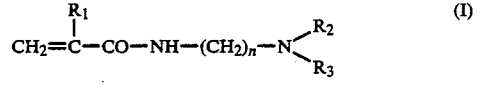

where
R$_1$ represents a hydrogen atom or a methyl,
R$_2$ and R$_3$ each represent a hydrogen atom or an alkyl group having from 1-4 carbon atoms, and
n represents an integer from 2 to 4; and said ethylene copolymer has a melt index, as measured in accordance with JIS K6760, of from 10 to 1,000 g/10 min.

* * * * *